United States Patent
Elahmadi et al.

(10) Patent No.: US 6,292,464 B1
(45) Date of Patent: *Sep. 18, 2001

(54) APPARATUS AND METHOD FOR SELF ROUTING CONTROL MECHANISM FOR RESTORING FIBER OPTIC COMMUNICATIONS NETWORK CONNECTIONS

(75) Inventors: Siraj Nour Elahmadi, Dallas; Shahid Akhtar, Garland, both of TX (US)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,252

(22) Filed: Sep. 17, 1997

(51) Int. Cl.[7] ............................ G01R 31/08; H04B 10/08
(52) U.S. Cl. ............................ 370/223; 359/110; 359/119
(58) Field of Search ........................ 370/222, 223, 370/224, 399, 411; 359/119, 110, 117; 709/233

(56) References Cited

U.S. PATENT DOCUMENTS

| | | | |
|---|---|---|---|
| 4,910,730 | * | 3/1990 | Day et al. .............................. 370/411 |
| 5,130,984 | * | 7/1992 | Cisneros ................................ 370/399 |
| 5,396,357 | * | 3/1995 | Goossen et al. ...................... 359/119 |
| 5,457,556 | * | 10/1995 | Shiragaki .............................. 359/117 |
| 5,717,796 | * | 2/1998 | Clendening ........................... 370/224 |
| 5,751,696 | * | 5/1998 | Bechtel et al. ........................ 370/224 |
| 5,754,789 | * | 5/1998 | Nowatzyk et al. ................... 709/233 |
| 5,903,370 | * | 5/1999 | Johnson ................................ 359/119 |
| 6,005,694 | * | 12/1999 | Liu ........................................ 359/110 |

* cited by examiner

*Primary Examiner*—Hassan Kizou
*Assistant Examiner*—John Pezzlo
(74) *Attorney, Agent, or Firm*—Haynes and Boone, LLP

(57) ABSTRACT

A system and method for connecting traffic along a communications network is accomplished by rerouting traffic upon the detection of a fault condition along a primary connection path. A laser-diode transmitter, uniquely tagged, transmits a specific bit pattern signature header unique to the transmitter at the beginning of a predetermined transmission sequence. The network recognizes the unique identifier and configures the network to route all traffic from the identified transmitter along a specific path to its intended destination.

12 Claims, 3 Drawing Sheets

APPARATUS AND METHOD FOR SELF ROUTING CONTROL MECHANISM FOR RESTORING FIBER OPTIC COMMUNICATIONS NETWORK CONNECTIONS

BACKGROUND OF THE INVENTION

1. Related Case(s)

This application is related to Attorney Docket No. RR2092 entitled "APPARATUS AND METHOD FOR RESTORING FIBER OPTIC COMMUNICATIONS NETWORK CONNECTIONS" filed on Jul. 11, 1997, Ser. No. 08/893,433 which is hereby incorporated by reference.

2. Field of the Invention

The present invention relates generally to communications systems and specifically to fault tolerant fiber optic communication networks.

DESCRIPTION OF THE RELATED ART

Fiber optic communication systems are traditionally deployed in a point-to-point terminal configuration along a single path. A problem occurs if the connection path is somehow interrupted either due to equipment failure or a physical disruption in the connection.

Self healing ring architectures may be a solution that protects against service disruption and node failure along a given primary path. Referring to FIG. 1, a ring architecture is presented. If a message to be transmitted from node 150 to node 130 clockwise along path A-B cannot be completed due to a failure in path B, then the message is routed counter-clockwise along alternate path D-C. In fact, in this architecture messages from node 120 intended for any node are also routed counter-clockwise to the intended destination node.

Drawbacks to the above system include the requirement for having expensive add/drop multiplexers and associated support equipment present in each node.

Most installed networks are point-to-point systems and balancing traffic around a ring can be difficult. Further, managing an all-ring network and provisioning demands across several interconnected rings is more difficult and expensive than in a point to point network.

There is a need for a fast and reliable trigger and control mechanism. Any control signal supplied from a central control point or via standard communication channels such as DCC or X.25 will be inherently too slow to achieve desired restoration speeds.

There is accordingly a need for a new method and apparatus for inexpensively and easily rerouting traffic between nodes in a communication network when a given path becomes unusable in order to solve or ameliorate one or more of the above-described problems.

SUMMARY OF THE INVENTION

According to a preferred embodiment of the present invention, a system and method for connecting traffic along a fiber optic communications network is accomplished by automatically rerouting traffic upon the detection of a fault condition along a primary connection path.

The above method and apparatus utilize the functionality of a laser-diode transmitter which is uniquely tagged. Each laser diode transmitter transmits a specific bit pattern header unique at the beginning of a predetermined transmission sequence. Such a predetermined sequence may be a packet, the data tag associated with the power-up condition of the transmitter or other periodic or aperiodic data sequence. The network recognizes the unique identifier and configures the network to route all traffic from the identified transmitter along a specific path to its intended destination.

Fiber optic transmissions operate over fiber in one direction between first and second optical switches at a first wavelength $\lambda_1$ and in the reverse direction at a second wavelength $\lambda_2$. A fault condition such as a broken fiber optic cable is detected at the optical switches when the previously transmitted signals are no longer received at either switch. Upon detection of the fault, the transmission of wavelength $\lambda_1$ is automatically re-routed based on predetermined routing information stored in table look-up format associated with each switch.

The specific unique bit pattern associated with the laser transmitter of the transmission is identified by the switch at its input port, re-routed and connected to the appropriate output port for transmission along an alternate or redundant fiber path to its destination.

The re-routing of the return transmission at wavelength $\lambda_2$ is done in an analogous manner.

The present invention is additionally applicable in restoring mesh or ring configurations and protects against single fiber or single equipment failures.

The foregoing features together with certain other features described hereinafter enable the overall system to have properties differing not just by a matter of degree from any related art, but offering an order of magnitude more efficient use of processing time and resources.

Additional features and advantages of the invention will be set forth in part in the description which follows, and in part will be apparent from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate preferred embodiments of the apparatus and method according to the invention and, together with the description, serve to explain the principles of the invention.

Note that generally the first digit of an item corresponds to the first figure in which that item is illustrated.

DETAILED DESCRIPTION

Figure 1:
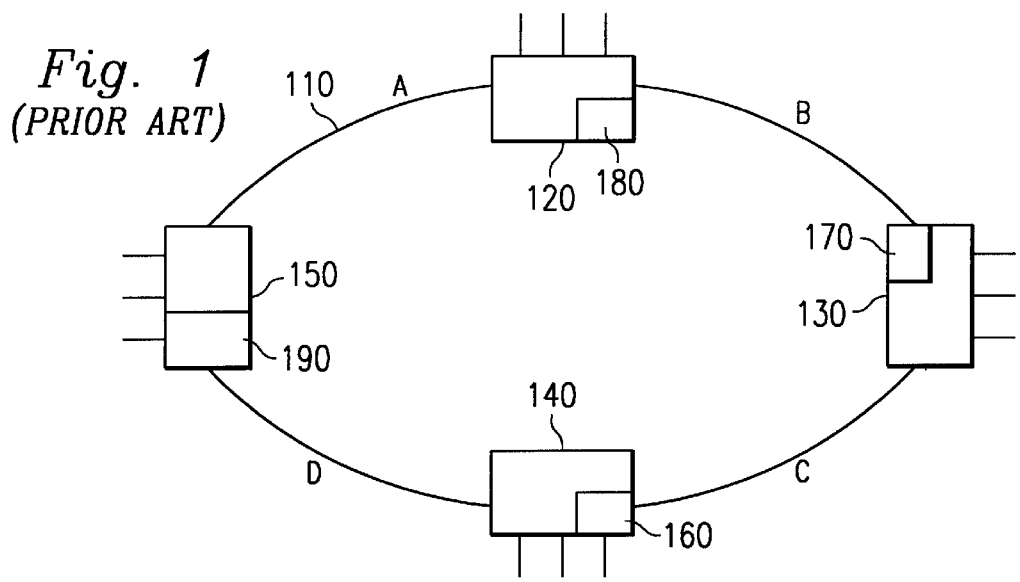
FIG. 1 illustrates a prior art self healing ring architecture.
Figure 2:
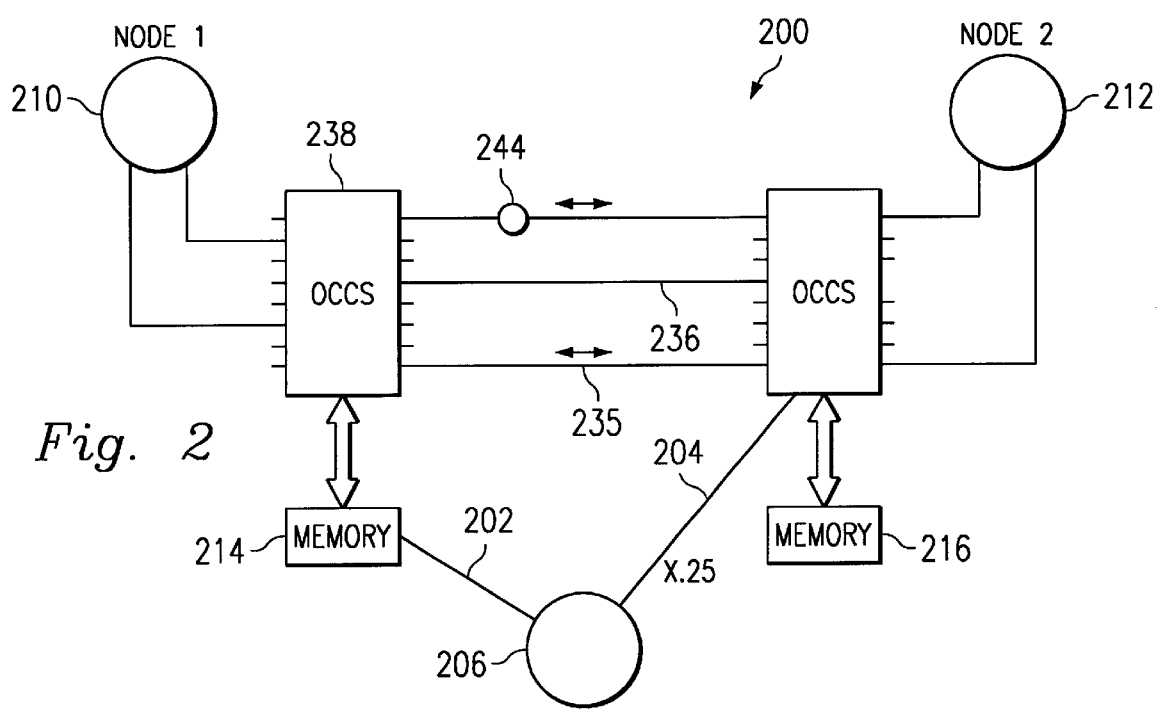
FIG. 2 illustrates a block diagram of a re-routed network of the present invention.

Referring now to FIG. 2, communications system 200 includes Node1 210 and Node2 212 connected via communication link 244, which in the preferred embodiment is a fiber optic connection with its associated switching components (not shown). Transmissions operate over fiber cable in one direction between first and second optical switches 238, 240 at a first wavelength $\lambda_1$ and in the reverse direction at a second wavelength $\lambda_2$.

Node1 210 and Node2 212 are also operably connected by redundant communication links 235, 236. Optical cross connect switches (OCCS) 238, 240 are placed in the connection path. OCCS 238 is associated with Node1 210 and OCCS 240 is associated with Node2 212. OCCSes 238, 240, typically 16×16 mechanical fiber optic switches in a preferred embodiment, serve to switch traffic among a number of desired routes via various fiber optic paths physically connected to each OCCS output port (not shown). However, the OCCS may be any mechanical or non-mechanical N×M switch. These OCCSes may be commercial off the shelf equipment.

A fault condition such as a break in the primary fiber optic cable 244 is detected at the optical switches 238, 240 when the previously transmitted signals are no longer received at either switch 238, 240. Upon detection of the fault, the transmission of wavelength $\lambda_1$ is automatically re-routed along alternate routes 235, 236 based on pre-determined routing information stored in look-up tables 214, 216 associated with each switch.

Specific information found in look-up tables 214, 216 is supplied periodically via X.25 links 202, 204 from an external source 206. Switching is not delayed while waiting for an update to occur and thus outages are quickly averted. These tables are updated only on an as-needed basis. The link may be any type of central or distributed control architecture.

The specific unique bit pattern associated with the laser transmitter of the transmission is identified by the switch at its input port, re-routed and connected to the appropriate output port for transmission along an alternate or redundant fiber path to its destination.

The re-routing of the return transmission at wavelength $\lambda_2$ is done in an analogous manner.

Only 2 nodes and a single matched pair of OCCSes are shown for simplicity. Any number of nodes and OCCSes with associated cabling may be used.

Figure 3:
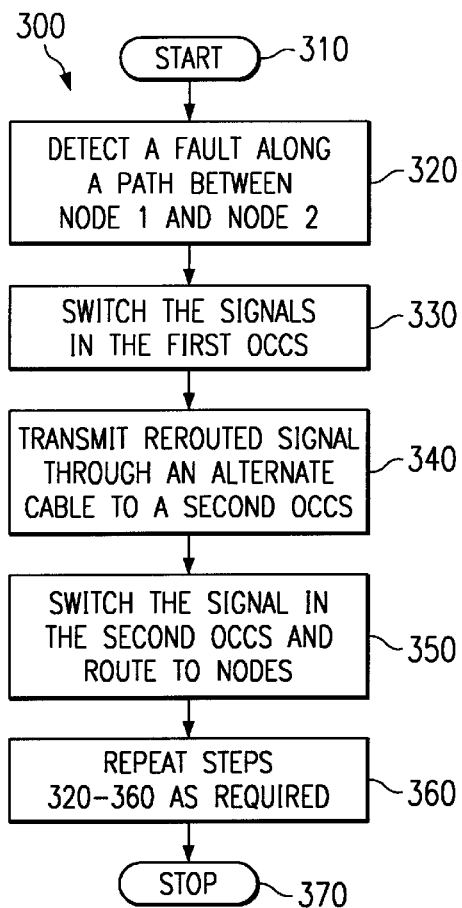
FIG. 3 illustrates a flowchart of the method of operation of rerouting a signal.

Referring now to FIG. 3, flowchart 300 depicts the method of operation of the instant invention. In step 320, a fault along main communication path 244 (FIG. 2.) has been detected by an external detection device (not shown) which may be in the OCCS 238, 240 for detecting the absence of the tag of the transmitting laser due to the communication path 244 failure.

The failure need only be detected at OCCSes 238, 240. An appropriate communication routing path is then configured from a table lookup in the OCCS. The table at each respective OCCS is updated and delivered from an external source along communication paths 202, 204.

In step 330, forward signals of a given wavelength $\lambda_1$ are transmitted from Node1 210 to OCCS 238 where it is switched internally to an appropriate output port. In step 340 the signal is transmitted through alternate fiber optic cable 236. In step 350, the signal is then routed inside OCCS 240 for transmission to Node2 212.

In step 360, the process is repeated in an analogous fashion with similar references to the opposite direction channel depicted in FIG. 2 if it is decided that a full-duplex or a return channel is desired.

Figure 4:
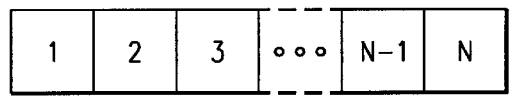
FIG. 4 illustrates a signature header of the present invention.

FIG. 4 illustrates the bit pattern of a typical signature characteristic of the present invention. The signal is an N byte long identifier which includes the M bit long source ID of the transmitting laser in a preferred embodiment. A total of $2^M$ unique lasers may be identified. The tag may also include a destination ID, bit rate or other user defined information. Of course, the signature may be of any type that accomplishes the same or similar function. A tag reader (not shown) operates by tapping approximately 1 percent of the power transmitted, detects a dithered signal and decodes the tag encoded in the dithered signal. The dithering is primarily used to suppress Stimulated Brillouin Scattering (SBS), but may also contain other information including a tag. The transmitter periodically sends this tag.

In an embodiment of the invention, M=N=8.

Figure 5:
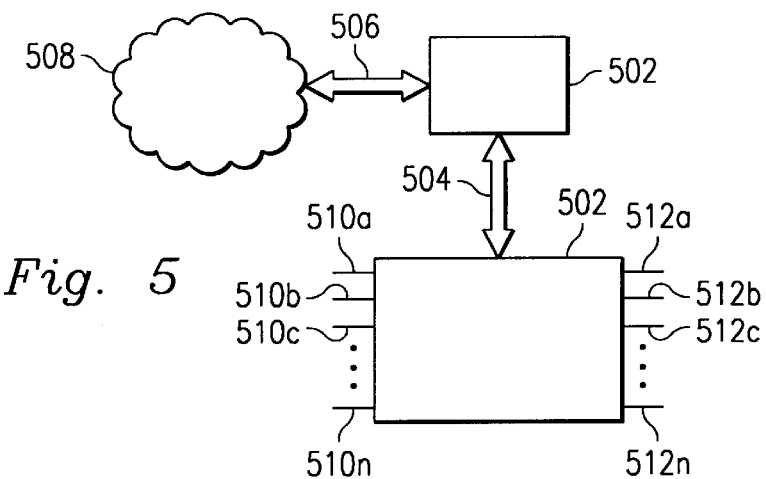
FIG. 5 illustrates a functional block diagram of an OCCS connection to an external network.

Referring now to FIG. 5, a portion of the network to be reconfigured is illustrated. OCCS 502 is connected to OCCS controller 502 through data bus 504. Controller 502 is operably connected to the rest of the network 508 through data interface 506. Routing information from an external source (not shown) is connected to network 508.

Figure 6:
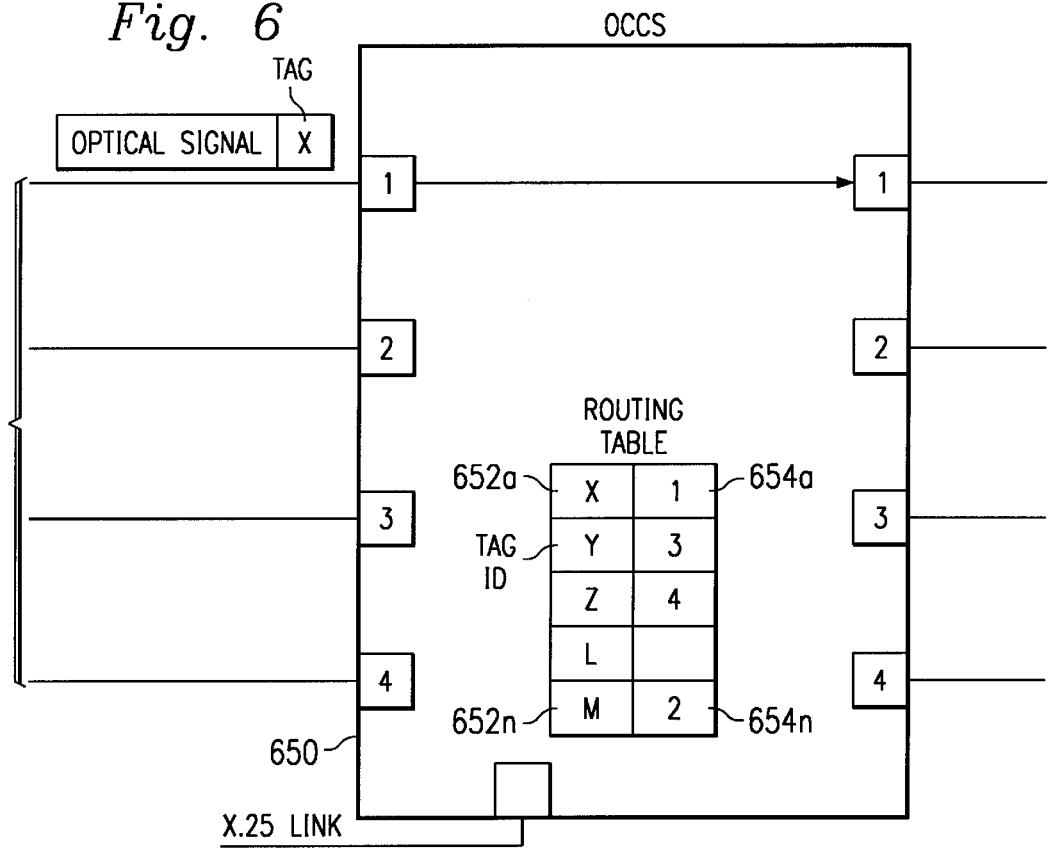
FIG. 6 illustrates a routing lookup table associated with an Optical Cross Connect Switch Controller.

FIG. 6 illustrates a table data structure 650 within OCCS controller 602. Each separate ID signature 652a–652n is associated with a predetermined destination 654a–n. Table information is obtained from an external data source within network 608.

Figure 7:
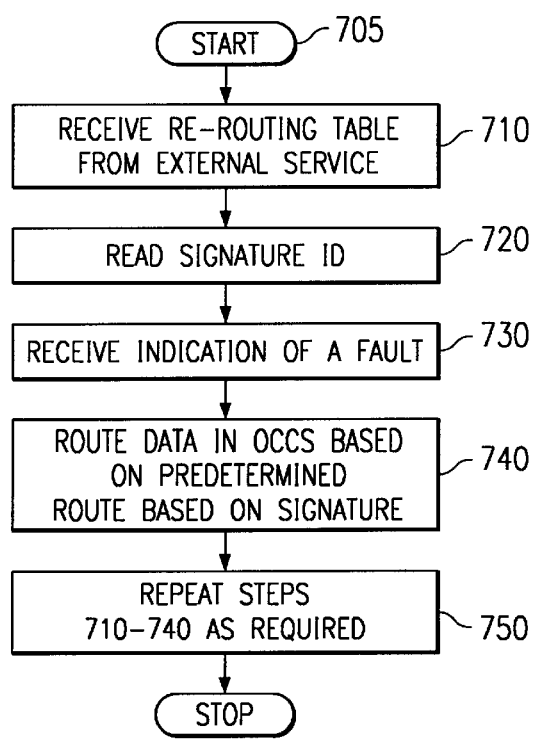
FIG. 7 illustrates a flow chart depiction of traffic re-routing of the present invention.

The methodology of data routing will now be explained with respect to FIG. 7. Step 705 starts the process. In step 710, the re-routing table located at each OCCS 238, 240 is updated prior to any detected error or rerouting. In step 720, the ID tag for the transmitted signal indicating the specific laser transmitter is continuously scanned by the tag reader associated with the OCCs 238, 240. In step 730, a fault detection indication between a source and destination node in adjacent OCCSes is received. Each OCCS looks up routing information in table look-up form in step 740 and routes the transmission according to the route found in the look-up table. When the signal has been routed to its destination via the alternate path, the methodology is repeated as appropriate. A return signal path may be formed in an analogous manner.

Other such embodiments of the invention will be apparent to those skilled in the art from consideration of the specification and practice of the invention disclosed herein. It is readily apparent that the above described invention may be implemented in any type of fiber optic communication system including both Asynchronous or a Synchronous Optical Network (SONET) configuration with any number of underlying transmission protocols such as Asynchronous Transfer Mode (ATM). However, it is intended that the above described invention has applications in any type of communication system through any type or combination of transmission media or with any compatible protocol. It is intended that the specification and examples be considered as exemplary only, with a true scope and spirit of the invention being indicated by the following claims.

What is claimed is:

1. A communication system for redundantly connecting a plurality of nodes in a fiber optic network environment comprising:

a primary fiber optic connection path operably connecting a first node comprising a first laser transmitter and a second node comprising a second laser transmitter;

a plurality of alternate fiber optic connection paths operably connecting said first node and said second node;

a first switch for transmitting a first signal having a first wavelength and including an identifying signature characteristic indicative of the first laser transmitter in a first direction along a selected one of said alternate fiber optic connection paths upon the detection of a specified event, wherein said selected one of said alternate fiber optic connection paths is selected based on predetermined routing information stored in a look-up table associated with said first switch using said identifying signature characteristic indicative of said first laser transmitter wherein said identifying signature characteristic of the first laser transmitter is a predetermined bit pattern associated with a transmission from said first node.

2. The communication system as in claim 1, further comprising:

a second switch corresponding to said second node for receiving said first signal, said second switch for transmission in a second direction along said selected one of said alternate fiber optic connection paths from said second switch to said first switch.

3. The communication system as in claim 1, wherein said specified event is a fault condition.

4. The communication system as in claim 1, further including an optical cross connect within said first switch.

5. A method of communicating among a plurality of nodes in a fault tolerant fiber optic network with multiple path connections among nodes, the method including the steps of:

receiving an indication of a detected fault condition along a first fiber optic path connection between a first node comprising a laser transmitter and a second node comprising a laser transmitter; and routing traffic along a second fiber optic path from said first node to said second node based on an identifying signature characteristic of the first laser transmitter; wherein said second fiber optic path is selected from a plurality of alternate fiber optic connection paths based on predetermined routing information stored in a look-up table associated with a first switch connected to said first node using said identifying signature characteristic indicative of said first laser transmitter wherein said identifying signature characteristic of said first laser transmitter is a predetermined bit pattern associated with a transmission from said first node.

6. The method of communicating as in claim 5, further including the steps of:

routing traffic from said second node to said first node on a selected fiber optic path based on a predetermined signature characteristic associated with said second laser transmitter.

7. The method of communicating as in claim 6, wherein said selected fiber optic path is equivalent to said second fiber optic path.

8. The method of communicating as in claim 6, wherein said selected fiber optic path includes portions equivalent to said second fiber optic path.

9. The method of communicating as in claim 6, wherein said selected fiber optic path includes portions equivalent to said first fiber optic path.

10. A communication system for communicating among a plurality of nodes in a fault tolerant fiber optic network with multiple path connections among nodes including:

means for receiving an indication of a fault condition along a first fiber optic path connection between a first node comprising a first laser transmitter and a second node comprising a second laser transmitter; and means for routing traffic along a second fiber optic path from said first node to said second node based on an identifying signature characteristic associated with said first laser transmitters wherein said second fiber optic path is selected from a plurality of alternate fiber optic connection paths based on predetermined routing information stored in a look-up table associated with a first switch connected to said first node using said identifying signature characteristic indicative of said first laser transmitter, wherein said identifying signature characteristic of the first laser transmitter is a predetermined bit pattern associated with a transmission from said first node.

11. Communication system as in claim 10, further including:

means for routing traffic from said second node to said first node on a selected fiber optic path from said second node to said first node by switching based on an identifying signature characteristic associated with said second laser transmitter.

12. The communication system according to claim 11, wherein said identifying signature characteristic associated with said second laser transmitter is another predetermined bit pattern.

* * * * *